United States Patent
Lee et al.

(10) Patent No.: US 12,192,661 B2
(45) Date of Patent: Jan. 7, 2025

(54) IMAGE SENSORS CHIP WITH DEPTH INFORMATION

(71) Applicant: NATIONAL YANG MING CHIAO TUNG UNIVERSITY, Hsinchu (TW)

(72) Inventors: Chen-Yi Lee, Hsinchu (TW); Hsi-Hao Huang, Taipei (TW); Tzu-Yun Huang, Toufen (TW)

(73) Assignee: NATIONAL YANG MING CHIAO TUNG UNIVERSITY, Hsinchu (TW)

( * ) Notice: Subject to any disclaimer, the term of this patent is extended or adjusted under 35 U.S.C. 154(b) by 168 days.

(21) Appl. No.: 18/191,714

(22) Filed: Mar. 28, 2023

(65) Prior Publication Data
US 2024/0137671 A1 Apr. 25, 2024
US 2024/0236527 A9 Jul. 11, 2024

(30) Foreign Application Priority Data
Oct. 22, 2022 (TW) .................................. 111140148

(51) Int. Cl.
*H04N 25/773* (2023.01)
*G04F 10/00* (2006.01)
*H04N 25/779* (2023.01)

(52) U.S. Cl.
CPC ......... *H04N 25/773* (2023.01); *G04F 10/005* (2013.01); *H04N 25/779* (2023.01)

(58) Field of Classification Search
CPC .......................... H04N 25/773; H04N 25/779
USPC ........................................................... 348/294
See application file for complete search history.

(56) References Cited

U.S. PATENT DOCUMENTS

| | | | |
|---|---|---|---|
| 11,431,918 B1* | 8/2022 | Price | H04N 5/253 |
| 2013/0300838 A1 | 11/2013 | Borowski | |
| 2020/0092540 A1* | 3/2020 | Tsai | G01J 1/44 |
| 2022/0246783 A1 | 8/2022 | Sorgenfrei et al. | |

FOREIGN PATENT DOCUMENTS

TW 2020/18329 A 5/2020

* cited by examiner

*Primary Examiner* — Joel W Fosselman
(74) *Attorney, Agent, or Firm* — Christensen, Fonder, Dardi & Herbert PLLC

(57) ABSTRACT

An image sensor chip with depth information is provided. The image sensor chip includes an SPAD array, a time-to-digital converter module, a storage circuit, and a data processing circuit. The SPAD array includes a plurality of image sensor units, and each of the image sensor units includes a plurality of SPAD units and a decision circuit, wherein each of the SPAD units outputs a photon detection result within a scan period, and the decision circuit generates an image-sensing signal based on the photon detection results. The time-to-digital converter module generates a plurality of first time data in response to the image-sensing signals. The storage circuit stores the first time data temporarily. The data processing unit reads the first time data from the storage circuit and generates a plurality of second time data in response to the first time data.

14 Claims, 6 Drawing Sheets

IMAGE SENSORS CHIP WITH DEPTH INFORMATION

PRIORITY

This application claims priority to Taiwan Patent Application No. 111140148 filed on Oct. 22, 2022, which is hereby incorporated by reference in its entirety.

FIELD OF THE INVENTION

The present invention relates to image sensor chips with depth information. More specifically, the present invention relates to image sensor chips comprising a single photon avalanche diode array and providing depth information.

BACKGROUND OF THE INVENTION

Single photon detectors can detect weak light signals in the environment due to their ability to detect one single photon, and therefore, they apply to various fields, such as quantum communication, biomedical photoelectric detection, and optical ranging. Nowadays, there are various single photon detectors, e.g., Charge Coupled Devices (CCD), quantum dot infrared photodetectors, and Single Photon Avalanche Diode (SPAD) detectors.

Among these different types of single photon detectors, those adopting SPAD(s) are particularly favored due to being compatible with the Complementary Metal-Oxide Semiconductor (CMOS) standard fabrication process. However, SPADs are too sensitive to light and environmental noise, which leads to the problem that photons are usually detected erroneously. Thus, accuracies of detection results are usually unsatisfactory. Furthermore, if there is a need to perform a wide-range photon detection, a single photon detector has to be equipped with a certain number of SPAD units. In that case, a huge amount of data needs to be outputted, and the output would be delayed.

In view of the preceding reasons, an image sensor chip that can detect light accurately to provide high-precision depth measurement and that can output measurement results rapidly is still needed in this technical field.

SUMMARY OF THE INVENTION

An objective of the present invention is to provide an image sensor chip. The image sensor chip comprises a Single Photon Avalanche Diode (SPAD) array, a Time-to-Digital Converter (TDC) module, a first storage circuit, and a data processing circuit. The SPAD array comprises a plurality of image sensor units. Each of the image sensor units comprises a plurality of SPAD units and a decision circuit, wherein each of the SPAD units is configured to output a photon detection result within a scan period, and the decision circuit is configured to generate an image-sensing signal based on the photon detection results. The TDC module is configured to generate a plurality of first time data in response to the image-sensing signals. The first storage circuit is configured to store the first time data temporarily. The data processing circuit is configured to read the first time data from the first storage circuit and generate a plurality of second time data corresponding to the first time data respectively.

In some embodiments of the present invention, under the condition that at least two of the photon detection results of the same image sensor unit indicate having detected a photon, the corresponding image-sensing signal indicates having detected a photon.

In some embodiments of the present invention, under the condition that at least one of the photon detection results of the same image sensor unit indicates having detected a photon, the corresponding image-sensing signal indicates having detected a photon.

In some embodiments of the present invention, each of the decision circuits is configured to select one of a plurality of detection modes based on a control signal to generate the corresponding image-sensing signal based on the corresponding photon detection results.

In some embodiments of the present invention, the data processing circuit is further configured to sort the first time data, record the first one of the sorted first time data by a first number of bits, and record a difference value between each of the second one to the $N^{th}$ one of the sorted first time data and their corresponding previous first time data by a second number of bits, wherein the second number of bits is smaller than the first number of bits, and N is a positive integer.

In some embodiments of the present invention, the image sensor chip further comprises a second storage circuit. The data processing circuit is further configured to output a compression indication bit and the second time data to the second storage circuit.

In some embodiments of the present invention, the TDC module comprises a plurality of TDC units, wherein the TDC units correspond to the image sensor units one-to-one. Each of the TDC units is configured to start counting in response to an activation signal, and each of the TDC units is configured to stop counting and generate the corresponding first time data in response to the corresponding image-sensing signal.

In some embodiments of the present invention, the TDC module comprises a plurality of TDC units and a global timing generator. The TDC units correspond to the image sensor units one-to-one. The global timing generator is configured to generate a plurality of oscillation signals delayed by different time lengths in response to an activation signal, generate a plurality of first output bits by applying priority encoding to the oscillation signals, and output the first output bits to the TDC units. Each of the TDC units is further configured to start counting in response to the first one of the oscillation signals, and each of the TDC units is further configured to stop counting and store a plurality of second output bits corresponding to a counting result in response to the corresponding image-sensing signal. Each of the first time data comprises the first output bits and the corresponding second output bits.

In some embodiments of the present invention, the TDC module comprises a plurality of TDC units and a global timing generator. The TDC units correspond to the image sensor units one-to-one. The global timing generator is configured to generate a plurality of oscillation signals delayed by different time lengths in response to an activation signal, generate a plurality of first output bits by applying priority encoding to the oscillation signals, output the first output bits to the TDC units, start counting in response to the first one of the oscillation signals, and output a plurality of second output bits to the TDC units. Each of the TDC units is further configured to stop updating the corresponding second output bits in response to the corresponding image-sensing signal, and each of the first time data comprises the first output bits and the corresponding second output bits.

In some embodiments of the present invention, the global timing generator is further configured to adjust the time lengths in response to an adjustment signal.

In some embodiments of the present invention, the TDC module is further configured to transmit at least one lock signal, and each of the at least one lock signal is for stopping the corresponding image sensing unit to detect photons temporarily.

In some embodiments of the present invention, the image sensor chip further comprises a clock generator. The clock generator is configured to provide a first clock signal with a first frequency to the TDC module and provide a second clock signal with a second frequency to the data processing circuit.

The image sensor chip provided by the present invention has a special architecture: each of the image sensor units in the SPAD array comprises a plurality of SPAD units. With this architecture, each of the image sensor units can be set, based on the requirement of the practical application, to determine that the image sensor unit does detect photons under the condition that at least one, at least two, or at least other numbers of SPAD units detect photons. As each of the image sensor units can be set to determine that the image sensor unit does detect photon under the condition that more than one SPAD unit detects photon, erroneous determination of the SPAD unit(s) caused by the environmental noise can be prevented. Furthermore, as the data processing circuit of the image sensor chip can compress the first time data, the present invention can achieve not only reducing the required output bandwidth but also increasing the output speed. Hence, the image sensor chip provided by the present invention can detect light accurately to provide high-precision depth measurement and can output measurement results rapidly.

The detailed technology and preferred embodiments implemented for the subject invention are described in the following paragraphs accompanying the appended drawings for a person having ordinary skill in the art to appreciate the features of the claimed invention well.

DETAILED DESCRIPTION

In the following descriptions, image sensor chips with depth information provided by the present invention are explained regarding certain embodiments. However, these embodiments are not intended to limit the present invention to any specific environment, application, or implementation described in these embodiments. Therefore, descriptions of these embodiments illustrate rather than limit the scope of the present invention. It should be noted that elements unrelated to the present invention are omitted from the depiction in the following embodiments and the attached drawings. Dimensions of and dimensional scales between individual elements in the attached drawings are provided only for ease of depiction and illustration but not to limit the scope of the present invention. Moreover, unless additionally explained, the expressions "a," "the," or the like recited in the specification and the claims should include both the singular and the plural forms.

Figure 1:
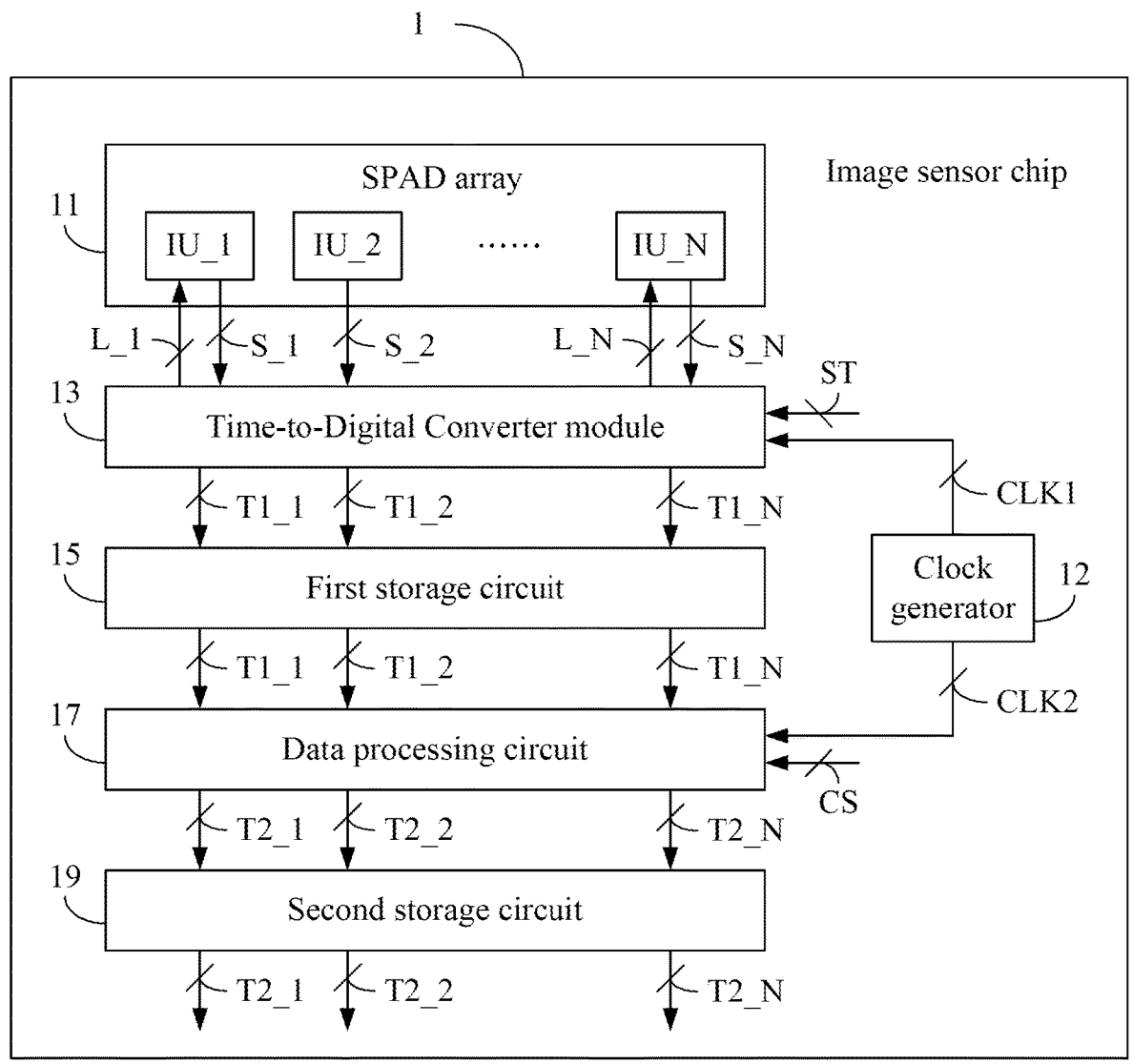
FIG. 1 is the schematic diagram of the architecture of the image sensor chip 1 in some embodiments of the present invention.

FIG. 1 is the schematic diagram of the architecture of the image sensor chip 1 with depth information in some embodiments of the present invention. The image sensor chip 1 comprises a Single Photon Avalanche Diode (SPAD) array 11, a Time-to-Digital Converter (TDC) module 13, a first storage circuit 15, and a data processing circuit 17. The SPAD array 11 comprises a plurality of image sensor units IU_1, IU_2, . . . , and IU_N. Please note that the present invention does not limit the number of the image sensor units IU_1, IU_2, . . . , and IU_N comprised in the SPAD array 11. Furthermore, depending on the requirement of practical application, the image sensor units IU_1, IU_2, . . . , and IU_N comprised in the SPAD array 11 may be arranged in a one-dimensional array or a two-dimensional array.

Each of the image sensor units IU_1, IU_2, . . . , and IU_N comprises a plurality of SPAD units and a decision circuit. For each of the image sensor units IU_1, IU_2, . . . , and IU_N, each of the SPAD units comprised therein individually outputs a photon detection result within a scan period (i.e., outputs a signal indicating whether photon(s) has/have been detected) and the decision circuit comprised therein generates an image-sensing signal based on the photon detection results. Thus, within a scan period, the image sensor units IU_1, IU_2, . . . , and IU_N of the SPAD array 11 respectively generate the image-sensing signals S_1, S_2, . . . , and S_N.

Figure 2:
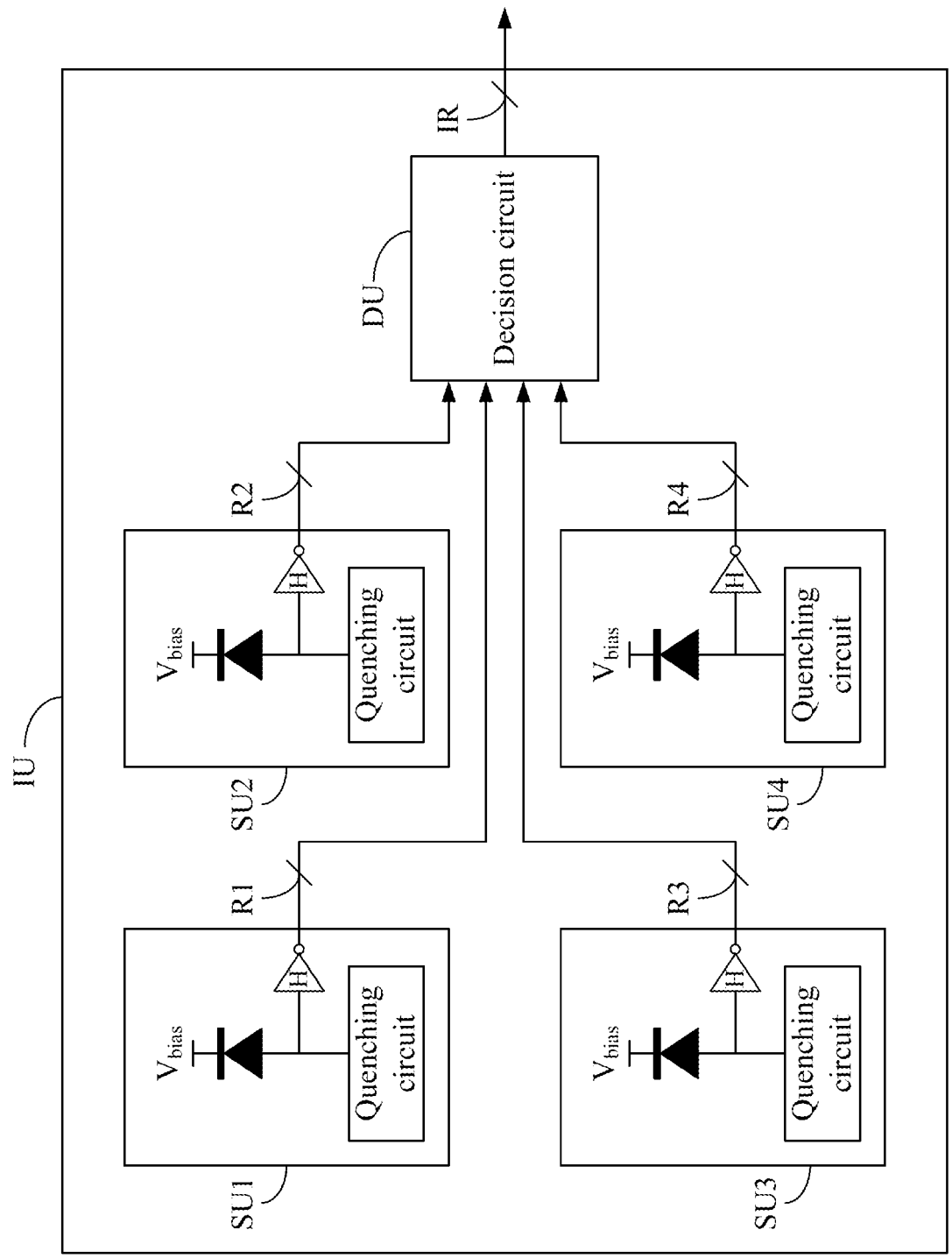
FIG. 2 is the schematic diagram of the image sensor unit IU in a specific example.

Please refer to a specific example shown in FIG. 2 for better understanding, which, however, is not used to limit the scope of the present invention. In this specific example, an image sensor unit IU (which represents any of the image sensor units IU_1, IU_2, . . . , and IU_N) comprises four SPAD units SU1, SU2, SU3, and SU4 and a decision circuit DU. The SPAD units SU1, SU2, SU3, and SU4 have the same circuit architecture. Each of the SPAD units SU1, SU2, SU3, and SU4 may comprise a photodiode, a quenching circuit, and an inverter that can work under high voltage, wherein these circuit elements can be coupled as shown in FIG. 2. Under the bias voltage Vbias, the SPAD units SU1, SU2, SU3, and SU4 perform photon detection within a scan period individually and output the photon detection results R1, R2, R3, and R4, respectively. The decision circuit DU generates an image-sensing signal IR based on the photon detection results R1, R2, R3, and R4. The image-sensing signal IR outputted by the image sensor unit IU represents whether the image sensor unit IU detects photon(s) within the scan period.

In some embodiments, the decision circuit DU of the image sensor unit IU can be designed to generate an image-sensing signal indicating that the image sensor unit IU has detected photon(s) under the condition that at least two of its received photon detection results indicate having detected photon(s). That is, an image sensor unit IU will consider itself as having detected photon(s) when at least two of its SPAD units SU1, SU2, SU3, and SU4 are excited. This way, erroneous decision caused by SPAD unit(s) being interfered by noise can be prevented.

Figure 3:
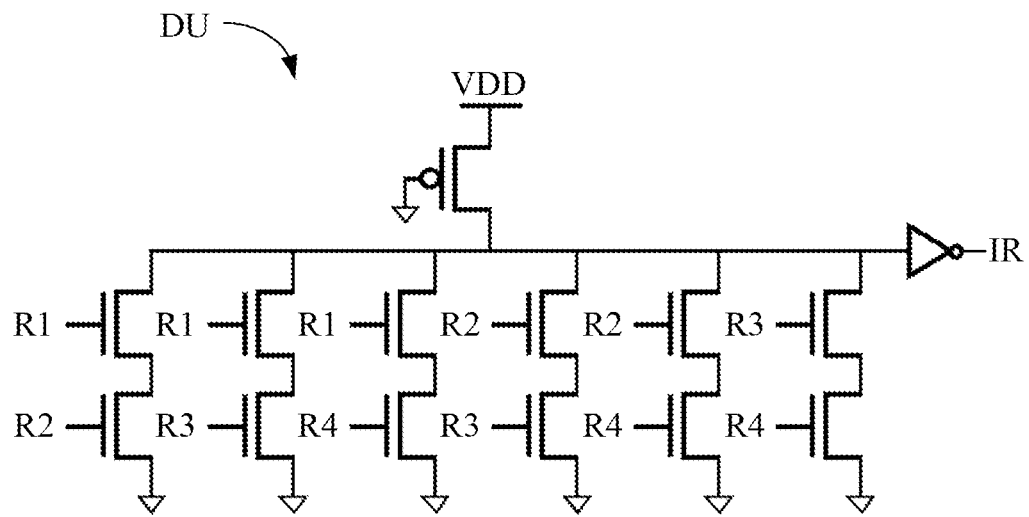
FIG. 3 is the schematic diagram of the decision circuit DU in a specific example.
Figure 4:
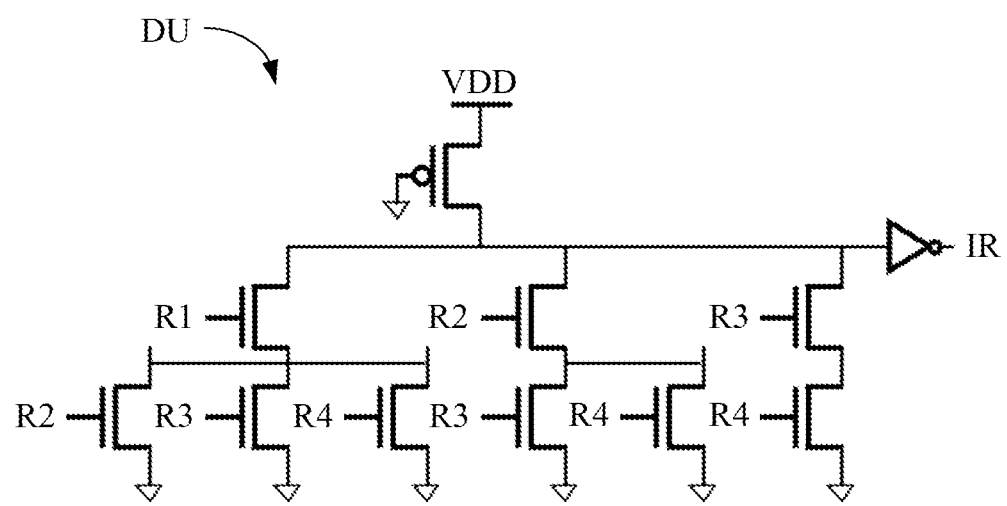
FIG. 4 is the schematic diagram of the decision circuit DU in another specific example.

Please refer to two specific examples shown in FIG. 3 and FIG. 4 for better understanding, which, however, are not used to limit the scope of the present invention. FIG. 3 and FIG. 4 show different circuit designs for the decision circuit DU, and both are suitable for the image sensor unit IU shown in FIG. 2 (i.e., the embodiments that an image sensor unit IU comprises four SPAD units). Moreover, the decision circuits DU shown in FIG. 3 and FIG. 4 are designed to work under the working voltage VDD for circuit operation. When two of the photon detection results R1, R2, R3, and R4 indicate having detected photon(s), the image-sensing signal IR indicates that the image sensor unit IU has detected photon(s). The image-sensing signals IR shown in FIG. 3 and FIG. 4 can be formulated by the following equation (1) and equation (2):

$$IR = R_1R_2 + R_1R_3 + R_1R_4 + R_2R_3 + R_2R_4 + R_3R_4 \quad (1)$$

$$IR = R_1(R_2+R_3+R_4) + R_2(R_3+R_4) + R_3R_4 \quad (2)$$

The decision circuits DU based on the circuit designs shown in FIG. 3 and FIG. 4 will generate the same image-sensing signals IR. However, compared to the one adopting the circuit design shown in FIG. 3, the decision circuit DU with the circuit design shown in FIG. 4 will have a smaller circuit area.

In some embodiments, the decision circuit of the image sensor unit IU can be designed to generate an image-sensing signal indicating that the image sensor unit IU has detected photon(s) under the condition that other number (e.g., more than two) of its received photon detection results indicate having detected photon(s). That is, the image sensor unit IU will consider itself as having detected photon(s) when said other number of its SPAD units are excited. This kind of design adopts a stricter rule to prevent erroneous decisions caused by SPAD unit(s) being interfered by noise.

In some embodiments, the decision circuit of the image sensor unit IU can be designed to generate an image-sensing signal indicating that the image sensor unit IU has detected photon(s) under the condition that at least one of its received photon detection results indicates having detected photon(s). That is, the image sensor unit IU will consider itself as having detected photon(s) as long as at least one of its SPAD units is excited. This kind of design is suitable for applications that intend to detect weak light and are tolerable to erroneous decisions caused by SPAD unit(s) being interfered by noise.

In some embodiments, the image sensor chip 1 can provide different detection modes for selection. In different detection modes, the image sensor unit IU considers itself as having detected photon(s) when different numbers of its SPAD units are excited. For example, the image sensor chip 1 can provide a first detection mode and a second detection mode. In the first detection mode, the image sensor unit IU considers itself as having detected photon(s) when at least one of its SPAD units is excited. Regarding the second detection mode, the image sensor unit IU considers itself as having detected photon(s) when at least two of its SPAD units are excited. In those embodiments, the decision circuit of the image sensor unit IU selects one of the detection modes based on a control signal and then generates a corresponding image-sensing signal based on the corresponding photon detection results.

Figure 5:
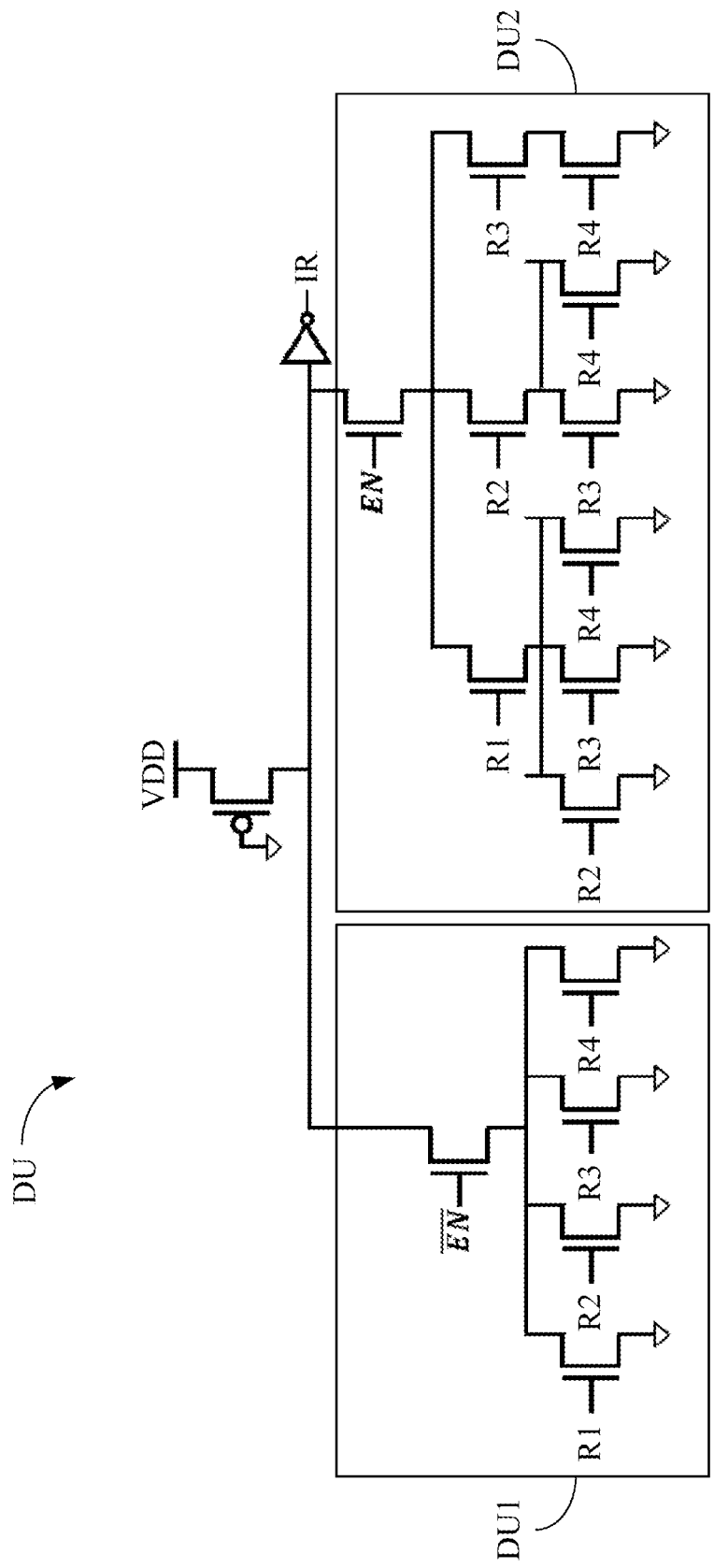
FIG. 5 is the schematic diagram of the decision circuit DU in yet another specific example.

Please refer to a specific example shown in FIG. 5 for better understanding, which, however, is not used to limit the scope of the present invention. The decision circuit DU shown in FIG. 5 is suitable for the image sensor unit IU shown in FIG. 2 (i.e., the embodiments that an image sensor unit IU comprises four SPAD units). The decision circuit DU comprises two sub-circuits DU1 and DU2, wherein the sub-circuit DU1 corresponds to the aforesaid first detection mode and the sub-circuit DU2 corresponds to the aforesaid second detection mode. The decision circuit DU selects the first detection mode or the second detection mode based on a control signal EN and then generates a corresponding image-sensing signal IR based on the corresponding photon detection results R1, R2, R3, and R4. More specifically, the sub-circuit DU2 operates (i.e., the second detection mode is selected) when the control signal EN is enabled, and the sub-circuit DU1 operates (i.e., the first detection mode is selected) when the control signal EN is disabled.

As described above, within a scan period, the image sensor units IU_1, IU_2, . . . , and IU_N of the SPAD array 11 respectively generate the image-sensing signals S_1, S_2, . . . , and S_N.

The TDC module 13 generates a plurality of first time data T1_1, T1_2, . . . , and T1_N in response to the image-sensing signals S_1, S_2, . . . , and S_N respectively. It is noted that the first time data T1_1, T1_2, . . . , and T1_N correspond to the image-sensing signals S_1, S_2, . . . , and S_N one-to-one; hence, the first time data T1_1, T1_2, . . . , and T1_N correspond to the image sensor units IU_1, IU_2, . . . , and IU_N one-to-one. Each of the first time data T1_1, T1_2, . . . , and T1_N represents a time length from a start time point of the scan period to a time point that the corresponding image sensor unit detects photon(s) (i.e., the time length starting from the laser pulse being emitted to the corresponding reflected laser pulse from an object surface being detected). Nevertheless, a first time datum will be of value 0 if the corresponding image sensor unit does not detect photon. Each of the first time data T1_1, T1_2, . . . , and T1_N reflects a depth information. That is, the depths (i.e., distances) between the image sensor units IU_1, IU_2, . . . , and IU_N and an object surface can be respectively calculated based on the first time data T1_1, T1_2, . . . , and T1_N. The first time data T1_1, T1_2, . . . , and T1_N generated by the TDC module 13 will temporarily be stored in the first storage circuit 15.

In some embodiments, the TDC module 13 further transmits at least one lock signal, wherein each lock signal is transmitted to one of the image sensor units IU_1, IU_2, . . . , and IU_N, and each lock signal is for stopping the corresponding image-sensing unit to detect photon temporarily (i.e., will not be exited). More specifically, within a scan period, if the TDC module 13 learns that an image sensor unit has detected photon(s) from an image-sensing signal generated by that image sensor unit, the TDC module 13 transmits a lock signal to that image sensor unit timely (e.g., immediately, within an extremely short time) to stop that image sensor unit from detecting photon(s) temporarily until the coming of the next scan period. In this way, for any image sensor unit, only the first arrived photon will be detected, and only the first time datum of the first arrived photon will be recorded by the TDC module 13.

Please refer to FIG. 1. As an example, the TDC module 13 learns that the image sensor unit IU_1 has detected photon(s) from the image-sensing signal S_1 and hence the TDC module 13 transmits a lock signal L_1 to the image sensor unit IU_1 to stop it from detecting photon(s) temporarily until the coming of the next scan period. In addition, the TDC module 13 learns that the image sensor unit IU_N has detected photon(s) from the image-sensing signal S_N and hence the TDC module 13 transmits a lock signal L_N to the image sensor unit IU_N to stop it from detecting photon(s) temporarily until the coming of the next scan period. Please note that the time point that the TDC module 13 transmits the lock signal L_1 and the time point that the TDC module 13 transmits the lock signal L_N can be different or the same.

The data processing circuit 17 reads the first time data T1_1, T1_2, . . . , and T1_N from the first storage circuit 15, generates a plurality of second time data T2_1, T2_2, . . . , and T2_N corresponding to the first time data T1_1, T1_2, . . . , and T1_N respectively, and outputs the second time data T2_1, T2_2, . . . , and T2_N.

In some embodiments, the image sensor chip 1 has sufficient output bandwidth; hence, the data processing circuit 17 will not compress the first time data T1_1, T1_2, . . . , and T1_N. In those embodiments, the second time data T2_1, T2_2, . . . , and T2_N are essentially equivalent to the first time data T1_1, T1_2, . . . , and T1_N respectively.

In some embodiments, the image sensor chip 1 generates the second time data T2_1, T2_2, . . . , and T2_N by compressing the first time data T1_1, T1_2, . . . , and T1_N to reduce the required output bandwidth.

In some embodiments, the data processing circuit 17 sorts the first time data T1_1, T1_2, . . . , and T1_N from the largest to the smallest, records the first one of the sorted first time data by a first number of bits, and records a difference value between each of the second one to the $N^{th}$ one of the sorted first time data and their corresponding previous first time data by a second number of bits (i.e., records a difference value between the second one of the sorted first time data and the first one of the sorted first time data by the second number of bits, records a difference value between the third one of the sorted first time data and the second one of the sorted first time data by the second number of bits, and so forth). The second number of bits is smaller than the first number of bits, and N is a positive integer. The first time datum recorded by the first number of bits and the (N−1) difference values (each of them is recorded by the second number of bits) are the second time data T2_1, T2_2, . . . , and T2_N.

In some embodiments, the image sensor chip 1 can provide two output modes, wherein the first output mode is the compression mode, and the second output mode is the non-compression mode. In those embodiments, the data processing circuit 17 further receives a compression setting CS. The compressing setting CS is used for instructing the data processing circuit 17 to adopt the first output mode (i.e., compressing the first time data) or the second output mode (i.e., not compressing the first time data). In addition, the data processing circuit 17 further outputs a compression indication bit (not shown) for indicating whether the second time data T2_1, T2_2, . . . , and T2_N are compressed or not so that a receiving end can read the second time data T2_1, T2_2, . . . , and T2_N by the corresponding mechanism correctly.

In some embodiments, the image sensor chip 1 further comprises a second storage circuit 19. In those embodiments, the second storage circuit 19 stores the second time data T2_1, T2_2, . . . , and T2_N temporarily and output them. The second storage circuit 19 also stores the compression indication bit (if there is one).

Herein, the TDC module 13 comprised in the image sensor chip 1 is described in detail.

In some embodiments, the TDC module 13 comprises a plurality of TDC units (not shown), wherein the TDC units correspond to the image sensor units IU_1, IU_2, . . . , and IU_N one-to-one. Each of the TDC units starts counting in response to an activation signal, and each of the TDC units stops counting and generates the corresponding first time data in response to the corresponding image sensing signal.

In some embodiments, the TDC module 13 comprises a plurality of TDC units and a global timing generator. The TDC units correspond to the image sensor units IU_1, IU_2, . . . , and IU_N one-to-one. The global timing generator generates one or a plurality of oscillation signals delayed by different time lengths in response to an activation signal ST. In one specific example, each of the oscillation signals is delayed by a positive integral multiple of 50 picoseconds, and the 50 picoseconds stand for the time resolution of the first time data T1_1, T1_2, . . . , T1_N generated by the TDC module 13. In addition, the global timing generator generates a plurality of first output bits by applying priority encoding to the oscillation signals (e.g., applying priority encoding to the binary sequence $0000111111111111_2$ to derive the corresponding hexadecimal sequence $0101_H$) and outputs the first output bits to the TDC units. Furthermore, each of the TDC units starts counting in response to the first one of the oscillation signals, and each of the TDC units stops counting in response to the corresponding image-sensing signal and stores a plurality of second output bits corresponding to a counting result. Each of the first time data comprises the first output bits and the corresponding second output bits. In some embodiments, the global timing generator further adjusts the aforesaid time lengths in response to an adjustment signal.

Figure 6:
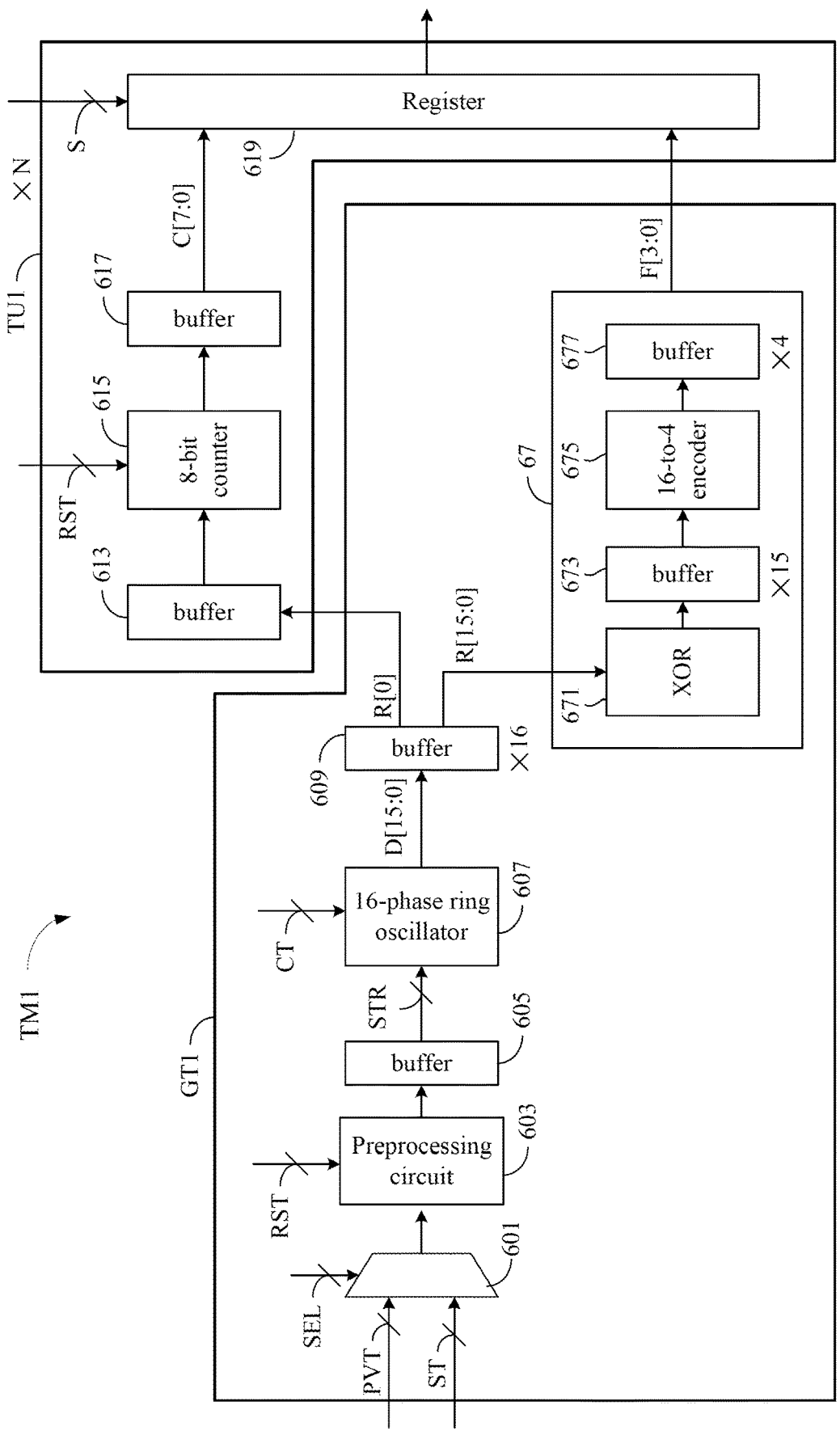
FIG. 6 is the schematic diagram of the TDC module TM1 in a specific example.

Please refer to a specific example shown in FIG. 6 for better understanding, which, however, is not used to limit the scope of the present invention. The TDC module TM1 shown in FIG. 6 comprises a global timing generator GT1 and N TDC units TU1 (in FIG. 6, the symbol ×N represents N copies).

The global timing generator GT1 is described herein. The multiplexer 601 is configured for receiving an adjustment signal PVT and an activation signal ST. The adjustment signal PVT is used in a test stage for adjusting the time length used by the 16-phase ring oscillator 607 for delaying oscillation signals so that the time length is close to a predetermined value (e.g., 50 picoseconds). The activation signal ST is used in an operation stage to indicate that a laser pulse has been activated (e.g., if a laser pulse is generated every 200 nanoseconds, the multiplexer 601 will receive an activation signal ST every 200 nanoseconds). The selection signal SEL is used for deciding whether the adjustment signal PVT or the activation signal ST can pass the multiplexer 601. The preprocessing circuit 603 is configured for receiving a reset signal RST, and the reset signal RST is used for resetting the 16-phase ring oscillator 607 in the global timing generator GT1 to zero. The reset signal RST will also be provided to the 8-bit counter 615 and the register 619 in all the TDC units TU1 to reset them to zero. The preprocessing circuit 603 is configured to receive output signals from the multiplexer 601 and transmit them to the buffer 605 to increase their driving power. If the output signal received by the preprocessing circuit 603 from the multiplexer 601 is originated from the activation signal ST, the signal outputted by the buffer 605 is the activation signal STR with increased driving power. The activation signal STR will be provided to the 16-phase ring oscillator 607.

The 16-phase ring oscillator 607 is configured for receiving the delay control signal CT, which is used for the 16-phase ring oscillator 607 to achieve the required time resolution. The delay control signal CT can be of a different number of bits in different embodiments depending on the target time resolution to be achieved. The delay control signal CT is used for adjusting the delay unit in the 16-phase ring oscillator 607 (e.g., controlling the charging time and/or discharging time by current) so that the 16 phases of the 16-phase ring oscillator 607 perform different degrees of delay to the activation signal STR (e.g., delay 50 picoseconds, delay 100 picoseconds, and so forth) and result in 16 oscillation signals D[15:0] delayed by different time lengths. The 16 oscillation signals D[15:0] are then respectively passed to the 16 buffers 609 (in FIG. 6, the symbol ×16 is used for indicating that there are 16 buffers 609) to increase driving power and result in 16 oscillation signals R[15:0].

The priority encoding circuit 67 of the global timing generator GT1 is configured to generate four first output bits F[3:0] by applying priority encoding to the 16 oscillation signals R[15:0]. To be more specific, the priority encoding circuit 67 comprises the XOR operator 671, 15 buffers 673 (in FIG. 6, the symbol ×15 is used to indicate that there are 15 buffers 673), the 16-to-4 encoder 675, and four buffers 677 (in FIG. 6, the symbol ×4 is used for indicating that there are four buffers 677), wherein the 15 buffers 673 and the four buffers 677 are used to increase the driving power of the corresponding input signals. The 16 oscillation signals R[15:0] will be processed by the XOR operator 671, the buffers 673, the 16-to-4 encoder 675, and the buffers 677 in sequence, which result in the four first output bits F[3:0]. By applying priority encoding, 16 signal lines are transformed into four output lines, and thereby interference between high-frequency signals can be prevented. The first output bits F[3:0] are provided to the register 619 of the N TDC units TU1.

As described above, the TDC module TM1 comprises N TDC units TU1, and the symbol ×N in FIG. 6 represents that there are N copies. Herein, one TDC unit TU1 is used as an example for elaboration. The first oscillation signal R[0] of the 16 oscillation signals R[15:0] is provided to the buffer 613 of the TDC unit TU1 to increase its driving power and then provided to the 8-bit counter 615 to make the 8-bit counter 615 start counting accordingly. The TDC unit TU1 will stop counting in response to the corresponding image-sensing signal S (i.e., one of the aforesaid image-sensing signals S_1, S_2, ..., S_N) and stores a plurality of second output bits C[7:0] corresponding to a counting result in the register 619. As only the oscillation signal R[0] is provided to the 8-bit counter 615 for operation, signal interference caused by excessive wiring can be prevented.

For each TDC unit TU1, the first output bits F[3:0] and its second output bits C[7:0] form the corresponding first-time datum, wherein the first output bits F[3:0] are the lower bits of the first-time datum (i.e., the portion of the finer granularity) and the second output bits C[7:0] are the higher bits of the first-time datum (i.e., the portion of the coarser granularity).

Please note that the buffers 605, 609, 613, 617, 673, and 677 are all used for increasing the driving power of the corresponding signal, which may be omitted depending on the practical situation. Moreover, the phase number of the 16-phase ring oscillator 607 and the bit number of the 8-bit counter 615 are not used to limit the scope of the present invention. In other embodiments, the phase number of a ring oscillator and/or the bit number of a counter can be of other values and, in that case, the number of the corresponding output signals, the number of buffers, the number of the input signals of the encoder, and the number of the output signals of the encoder will change accordingly.

In some embodiments, the TDC module 13 comprises a plurality of TDC units and a global timing generator. The TDC units correspond to the image sensor units IU_1, IU_2, ..., and IU_N one-to-one. The global timing generator generates a plurality of oscillation signals delayed by different time lengths in response to an activation signal ST, generates a plurality of first output bits by applying priority encoding to the oscillation signals, outputs the first output bits to the TDC units, start counting in response to the first one of the oscillation signals, and output a plurality of second output bits to the TDC units. Each of the TDC units stops updating the corresponding second output bits in response to the corresponding image-sensing signal. Each of the first time data comprises the first output bits and the corresponding second output bits.

Figure 7:
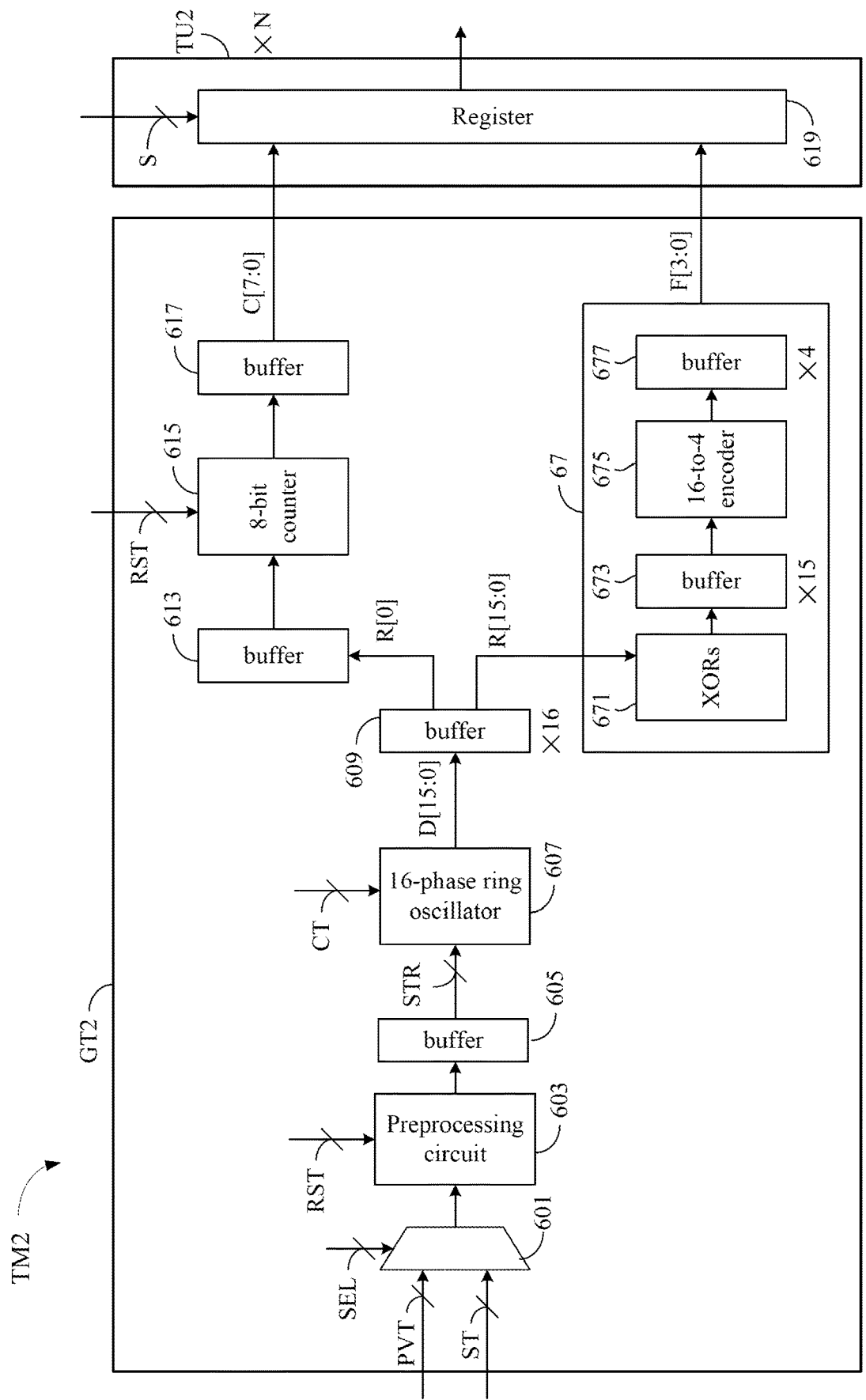
FIG. 7 is the schematic diagram of the TDC module TM2 in another specific example.

Please refer to a specific example shown in FIG. 7 for better understanding, which, however, is not used to limit the scope of the present invention. The TDC module TM2 shown in FIG. 7 comprises a global timing generator GT2 and N TDC units TU2 (in FIG. 7, the symbol ×N represents N copies). Compared to the example shown in FIG. 6, the global timing generator GT2 comprises not only the multiplexer 601, the preprocessing circuit 603, the buffer 605, the 16-phase ring oscillator 607, 16 buffers 609, and the priority encoding circuit 67 but also the buffer 613, the 8-bit counter 615, and the buffer 617. Each of the N TDC units TU2 comprises the register 619 but does not have the buffer 613, the 8-bit counter 615, and the buffer 617. Based on the descriptions related to FIG. 6, a person having ordinary skill in the art shall understand how the TDC module TM2 operates; hence, the details are not repeated herein. Regarding the TDC module TM2, the buffer 613, the 8-bit counter 615, and the buffer 617 are integrated into the global timing generator GT2. Hence, the circuit area of the TDC module TM2 is smaller than that of the TDC module TM1.

In some embodiments, the image sensor chip 1 further comprises a clock generator 12. For example, the clock generator 12 can be a Multiplying Delay-Locked Loop (MDLL). The clock generator 12 is configured to provide a first clock signal CLK1 having a first frequency to the TDC module 13 and provide a second clock signal CLK2 having a second frequency to the data processing circuit 17 so that the TDC module 13 and the data processing circuit 17 can operate.

It shall be appreciated that, in the specification and the claims of the present invention, some terms (e.g., storage circuit, time data, number of bits, output bits, detection mode, output mode, frequency, clock signal) are preceded by "first" or "second." Please note that "first" and "second" are used only for distinguishing different terms. If the order of these terms is not specified or cannot be derived from the context, the order of these terms is not limited by the preceded "first" and "second."

The image sensor chip provided by the present invention has a special architecture: each of the image sensor units in the SPAD array comprising a plurality of SPAD units. With this architecture, each of the image sensor units can be set, based on the requirement of the practical application, to determine that the image sensor unit does detect photons under the condition that at least one, at least two, or at least other numbers of SPAD units detect photons. As each of the image sensor units can be set to determine that the image sensor unit does detect photons under the condition that more than one SPAD unit detects photons, erroneous determination of the SPAD unit(s) caused by the environmental noise can be prevented. Furthermore, as the data processing circuit of the image sensor chip can compress the first time data, the present invention can achieve not only reducing the required output bandwidth but also increasing the output speed. Hence, the image sensor chip provided by the present invention can detect light accurately to provide high-precision depth measurement and can output measurement results rapidly.

The above disclosure is related to the detailed technical contents and inventive features. A person having ordinary skill in the art may proceed with various modifications and replacements based on the disclosures and suggestions of the invention as described without departing from the characteristics thereof. Nevertheless, although such modifications and replacements are not fully disclosed in the above descriptions, they have been substantially covered in the following claims as appended.

The invention claimed is:

1. An image sensor chip, comprising:
a Single Photon Avalanche Diode (SPAD) array, comprising a plurality of image sensor units, wherein each of the image sensor units comprises:
a plurality of SPAD units, wherein each of the SPAD units is configured to output a photon detection result within a scan period; and
a decision circuit, being configured to generate an image-sensing signal based on the photon detection results;
a Time-to-Digital Converter (TDC) module, being configured to generate a plurality of first time data in response to the image-sensing signals;
a first storage circuit, being configured to store the first time data temporarily; and
a data processing circuit, being configured to read the first time data from the first storage circuit and generate a plurality of second time data corresponding to the first time data respectively.

2. The image sensor chip of claim 1, wherein under a condition that at least two of the photon detection results of the same image sensor unit indicate having detected photon, the corresponding image-sensing signal indicates having detected photon.

3. The image sensor chip of claim 1, wherein under a condition that at least one of the photon detection results of the same image sensor unit indicate having detected photon, the corresponding image-sensing signal indicates having detected photon.

4. The image sensor chip of claim 1, wherein each of the decision circuits is configured to select one of a plurality of detection modes based on a control signal to generate the corresponding image-sensing signal based on the corresponding photon detection results.

5. The image sensor chip of claim 1, wherein the data processing circuit is further configured to sort the first time data, record the first one of the sorted first time data by a first number of bits, and record a difference value between each of the second one to the $N^{th}$ one of the sorted first time data and their corresponding previous first time data by a second number of bits, wherein the second number of bits is smaller than the first number of bits, and N is a positive integer.

6. The image sensor chip of claim 5, wherein the data processing circuit is further configured to output a compression indication bit and the second time data.

7. The image sensor chip of claim 5, further comprising:
a second storage circuit, being configured to temporarily store the compression indication bit and the second time data.

8. The image sensor chip of claim 1, wherein the TDC module comprises:
a plurality of TDC units, wherein the TDC units correspond to the image sensor units one-to-one, each of the TDC units is configured to start counting in response to an activation signal, and each of the TDC units is configured to stop counting and generate the corresponding first time data in response to the corresponding image-sensing signal.

9. The image sensor chip of claim 1, wherein the TDC module comprises:
a plurality of TDC units, wherein the TDC units correspond to the image sensor units one-to-one; and
a global timing generator, being configured to generate a plurality of oscillation signals delayed by different time lengths in response to an activation signal, generate a plurality of first output bits by applying priority encoding to the oscillation signals, and output the first output bits to the TDC units,
wherein each of the TDC units is further configured to start counting in response to the first one of the oscillation signals, and each of the TDC units is further configured to stop counting and store a plurality of second output bits corresponding to a counting result in response to the corresponding image-sensing signal,
wherein each of the first time data comprises the first output bits and the corresponding second output bits.

10. The image sensor chip of claim 9, wherein the global timing generator is further configured to adjust the time lengths in response to an adjustment signal.

11. The image sensor chip of claim 1, wherein the TDC module comprises:
a plurality of TDC units, wherein the TDC units correspond to the image sensor units one-to-one; and
a global timing generator, being configured to generate a plurality of oscillation signals delayed by different time lengths in response to an activation signal, generate a plurality of first output bits by applying priority encoding to the oscillation signals, output the first output bits to the TDC units, start counting in response to the first one of the oscillation signals, and output a plurality of second output bits to the TDC units,
wherein each of the TDC units is further configured to stop updating the corresponding second output bits in response to the corresponding image-sensing signal, and each of the first time data comprises the first output bits and the corresponding second output bits.

12. The image sensor chip of claim 11, wherein the global timing generator is further configured to adjust the time lengths in response to an adjustment signal.

13. The image sensor chip of claim 1, wherein the TDC module is further configured to transmit at least one lock signal, and each of the at least one lock signal is for stopping the corresponding image sensing unit to detect photon temporarily.

14. The image sensor chip of claim 1, further comprising:
a clock generator, being configured to provide a first clock signal with a first frequency to the TDC module and provide a second clock signal with a second frequency to the data processing circuit.

* * * * *